United States Patent
Smith

(10) Patent No.: US 6,778,066 B2
(45) Date of Patent: Aug. 17, 2004

(54) PERSONAL IDENTIFICATION BADGE THAT RESETS ON THE REMOVAL OF THE BADGE FROM THE WEARER

(75) Inventor: Mark T Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 09/896,569

(22) Filed: Jun. 29, 2001

(65) Prior Publication Data
US 2003/0001722 A1 Jan. 2, 2003

(51) Int. Cl.[7] ............................................. G05B 19/00
(52) U.S. Cl. ..................... 340/5.61; 340/3.1; 455/41; 235/380
(58) Field of Search ............................. 283/74, 75, 14; 340/5.21, 573.1, 573.4, 572.8, 825.15, 825.17, 5.8, 5.81, 3.1; 235/380, 382; 395/187.01, 188.01; 455/41; 295/187.01

(56) References Cited

U.S. PATENT DOCUMENTS

| | | | |
|---|---|---|---|
| 5,455,851 A | 10/1995 | Chaco et al. | |
| 5,537,102 A | * 7/1996 | Pinnow | 340/5.8 |
| 5,627,520 A | 5/1997 | Grubbs et al. | |
| 5,832,090 A | 11/1998 | Raspotnik | |
| 6,104,285 A | * 8/2000 | Stobbe | 340/505 |
| 6,346,886 B1 | * 2/2002 | De La Huerga | 340/573.1 |

FOREIGN PATENT DOCUMENTS

| | | |
|---|---|---|
| EP | 0323041 | 7/1989 |
| GB | 2355333 A | 4/2001 |
| WO | WO 00/04425 | 3/1993 |
| WO | WO 00/16284 | 3/2000 |

* cited by examiner

Primary Examiner—Michael Horabik
Assistant Examiner—Matsuichiro Shimizu

(57) ABSTRACT

A security badge to be worn by a person seeking access to a secure system. The badge includes a data processor having a non-volatile and a volatile memory, a transceiver, and an attachment sensor. The volatile memory stores information related to the wearer's security clearance. This information is loaded after the badge is attached to the person and the person's identity is verified. This information is deleted from the volatile memory if the badge is removed from the wearer or subjected to tampering. The data processing system has sufficient computing power to allow the badge to execute encrypted communications with the secure system.

37 Claims, 2 Drawing Sheets

PERSONAL IDENTIFICATION BADGE THAT RESETS ON THE REMOVAL OF THE BADGE FROM THE WEARER

FIELD OF THE INVENVTION

The present invention relates to security systems that regulate access to secure areas, and more particularly, to a security badge that is attached to the authorized person and resets itself when removed from that individual.

BACKGROUND OF THE INVENTION

To simplify the following discussion, the present invention will be explained in terms of security systems for use in accessing computers and the like; however, it will be apparent from the following discussion that the present invention may be utilized in other security systems.

Computer systems having access to a network typically utilize some form of access control to assure that unauthorized individuals do not gain access to confidential information or do damage to the network and/or computers connected thereto. The secure access protocols often require a user to memorize multiple passwords and protocols. For example, the user may need a first password to log onto a terminal in the network, a set of different passwords corresponding to the various servers in the networks or secure directories within a server, and yet another set of passwords relating to various software programs and related files.

Electronic identification cards have been used to automate the logon and access control processes. Such systems sense a personal identification presented by the user. The card can be in the form of a radio frequency identification (RFID) card which is sensed remotely by the computer terminal or a card that is passed through a reader by the user.

While such cards can be used to automate the logon process, they do not provide sufficient security to satisfy the needs of many systems. The authenticity of the card can, in principle, be verified by the system that queries the card; however, the system cannot necessarily identify the person presenting the card. An unauthorized person who has gained control of such a card can still access the system.

In principle, the computer terminal can be equipped with hardware that also allows it to authenticate the person presenting the card. In fact, if the person can be identified directly, then an identification card is not needed. Identification systems based on retinal scans, voiceprints, and fingerprints are well known in the art. This hardware would need to be present at each of the terminals. The cost of providing such hardware at each terminal is often prohibitive.

Even in those situations in which identification hardware is provided at each terminal, the system must still deal with interruptions that occur when the user leaves the terminal for a brief period of time. Consider the case of a user who has logged onto a terminal using some form of personal identification system. If the user leaves the terminal without logging off, an unauthorized user can gain access to the system through the open terminal. Hence, the terminal must have some method for determining that the authorized user remains present at the terminal after the logon. For example, an RFID card worn by the user can be queried periodically to determine that the user is still at the terminal.

If the authorized user breaks contact with the terminal, either because the user left the terminal for a short period of time or because the monitoring system failed to detect the person on one of the periodic queries, the terminal needs to disable itself. When the user again makes contact with the terminal, the logon process must be repeated. A logon process that verifies the identity of the user through fingerprints, retinal scans, etc. requires a relatively long procedure. Hence, such systems are frustrating to use, since a user who turns away from the computer or crosses the room to get a document can be forced to repeat the entire logon protocol.

Systems based on personal identification cards also present logistical problems for the users and system operators. In such systems, each user is provided with an identification card that must be presented to the system to gain authorization. The card is assigned to the particular user. To guard against an unauthorized person gaining control of the card, the assigned person usually takes the card home at night. If the user leaves the badge at home or loses the badge, the user must go through an often lengthy process of obtaining a new badge or some form of temporary badge in the case in which the user has left his or her badge at home. In addition, the system must provide one badge for each user who is authorized to use the system, whether or not that person will use the system on any particular day. Hence, the number of security badges that must be maintained can be quite large. Since these badges are typically powered by batteries, the costs of providing and maintaining the badges is significant.

Broadly, it is the object of the present invention to provide an improved security badge system.

It is a further object of the present invention to provide a security system that can authenticate a user without requiring expensive personal identification hardware at each work station.

These and other objects of the present invention will become apparent to those skilled in the art from the following detailed description of the invention and the accompanying drawings.

SUMMARY OF THE INVENTION

The present invention is a security badge to be worn by a person seeking access to a secure system. The badge includes a data processor having a non-volatile and a volatile memory, a transceiver, and an attachment sensor. The volatile memory stores information related to a security clearance associated with the person. This information is loaded after the badge is attached to the person. The transceiver sends signals generated by the processor and receives signals specifying operations to be carried out by the badge. These signals include signals that provide the person wearing the badge access to the secure system. Upon detecting the removal of the badge from the wearer, the attachment sensor causes information stored in the volatile memory to be altered such that the person no longer has access to the secure system. The transceiver can utilize optical, electromagnetic or acoustic signals for communicating with the secure system. In one embodiment of the invention, the badge includes a tamper sensor for detecting an alteration in the badge that could allow the contents of the volatile memory to be read and rendering information stored in the volatile memory unreadable when the tamper sensor detects such an alteration. In another embodiment, the badge includes a random number generator for generating random numbers for use in coded transmission between the badge and the secure system. The random number generator may utilize a sensor for sensing an environmental variable that determines the random number sequence generated by the random number generator. In another embodiment of the invention, the badge has low and high power modes, the processor being capable of performing at least one computation in the high power mode that cannot be performed in the low power mode. The processor switches from low power mode to high power mode in response to the transceiver detecting a predetermined signal while in the low power mode. In another embodiment of the invention, the attachment sensor includes an attachment mechanism and a position sensor. The attachment mechanism has an open position and a closed position. The attachment mechanism secures the badge to the person in the closed position. The position sensor monitors the state of the attachment mechanism.

DETAILED DESCRIPTION OF THE INVENTION

Figure 1:
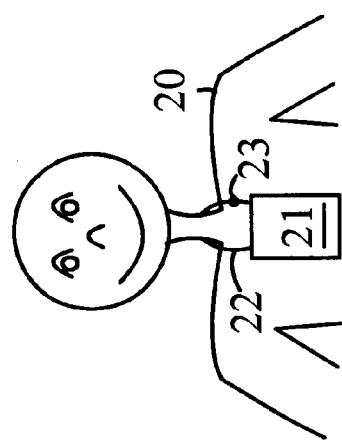
FIG. 1 is a schematic drawing of a system for securing access to a computer system having a number of terminals.
Figure 1:
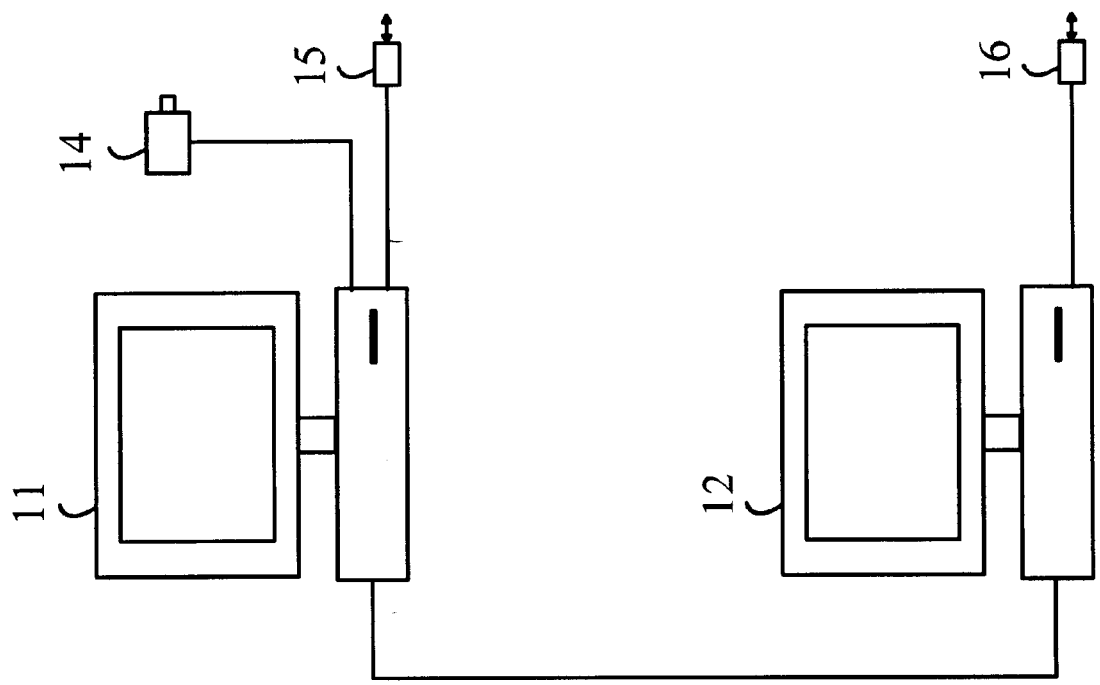

The manner in which the present invention provides its advantages may be more easily understood with reference to FIG. 1, which is a schematic drawing of a system for securing access to a computer system having terminals shown at 11 and 12. Access to the system is provided by a badge 21 that is worn by a user 20 who wishes to gain access. Badge 21 is affixed to the user in a manner in which the removal of badge 21 after it has been affixed can be detected by the badge. For example, badge 21 can be placed around the neck of user 20 via a cord 22 that includes a clasp 23. Cord 22 is short enough to guarantee that the badge cannot be removed from the neck of the wearer without undoing clasp 23 or breaking cord 22. Badge 21 has a sensor that detects the opening of clasp 23 or the breakage of cord 22. For example, cord 22 may include a conducting fiber whose continuity is sensed by badge 21. When clasp 23 is opened, this conductive path is broken.

To gain access to the computer system, user 20 puts on badge 21 and approaches terminal 11, which loads the information into badge 21 needed for the user to access one or more of the other workstations in the network. Terminal 11 includes a user identification system 14 that is utilized to verify the identity of user 20. Identification system 14 may include physical sensors such as those needed to make a voice print, retinal scan, or fingerprint scan. The identification system may also include a database having information known only to user 20, which may be utilized in generating queries that only user 20 would know how to answer.

Once the identity of user 20 has been established by terminal 11, terminal 11 loads information into badge 21 that is utilized by badge 21 in subsequent communications with the other terminals in the system. To simplify the following discussion, it will be assumed that the various terminals communicate with badge 21 via infra-red signals that are sent and received by the transceivers shown at 15–16. As will be explained in more detail below, this information is loaded using an encryption system that assures that an eavesdropper cannot gain access to the stored information in a manner that would allow the eavesdropper to communicate with the various terminals in the system.

In addition to loading the various clearances associated with user 20, a "day secret" is also loaded in badge 21. The day secret is a code that changes each day and is known to all of the workstations. Since the code changes from day to day, the permissions granted to user 21, in effect, expire each day.

Once badge 21 has been loaded with the various security clearances assigned to user 20, user 20 can approach the terminals that are authorized to serve user 20 such as terminal 12 and gain access thereto. Each terminal includes a transceiver that queries the identification badges. When a terminal detects a valid badge that has permission to use that terminal, the terminal allows the user to log onto the terminal and communicates the user's various clearances to the servers within the system.

The terminal in question periodically queries badge 21 to assure that the user is still at the terminal. If the terminal loses contact with the badge, the terminal covers any material on the display with a "screen saver" display and enters a first locked mode. During this mode, the terminal periodically sends out query signals. If the badge returns, the terminal utilizes an abbreviated logon dialog to verify the user and returns the display to the condition at the time communication was originally lost. If the user is absent for more than a first predetermined time period, the terminal enters a second locked mode which requires a more extensive logon protocol to return control to the user.

Figure 2:
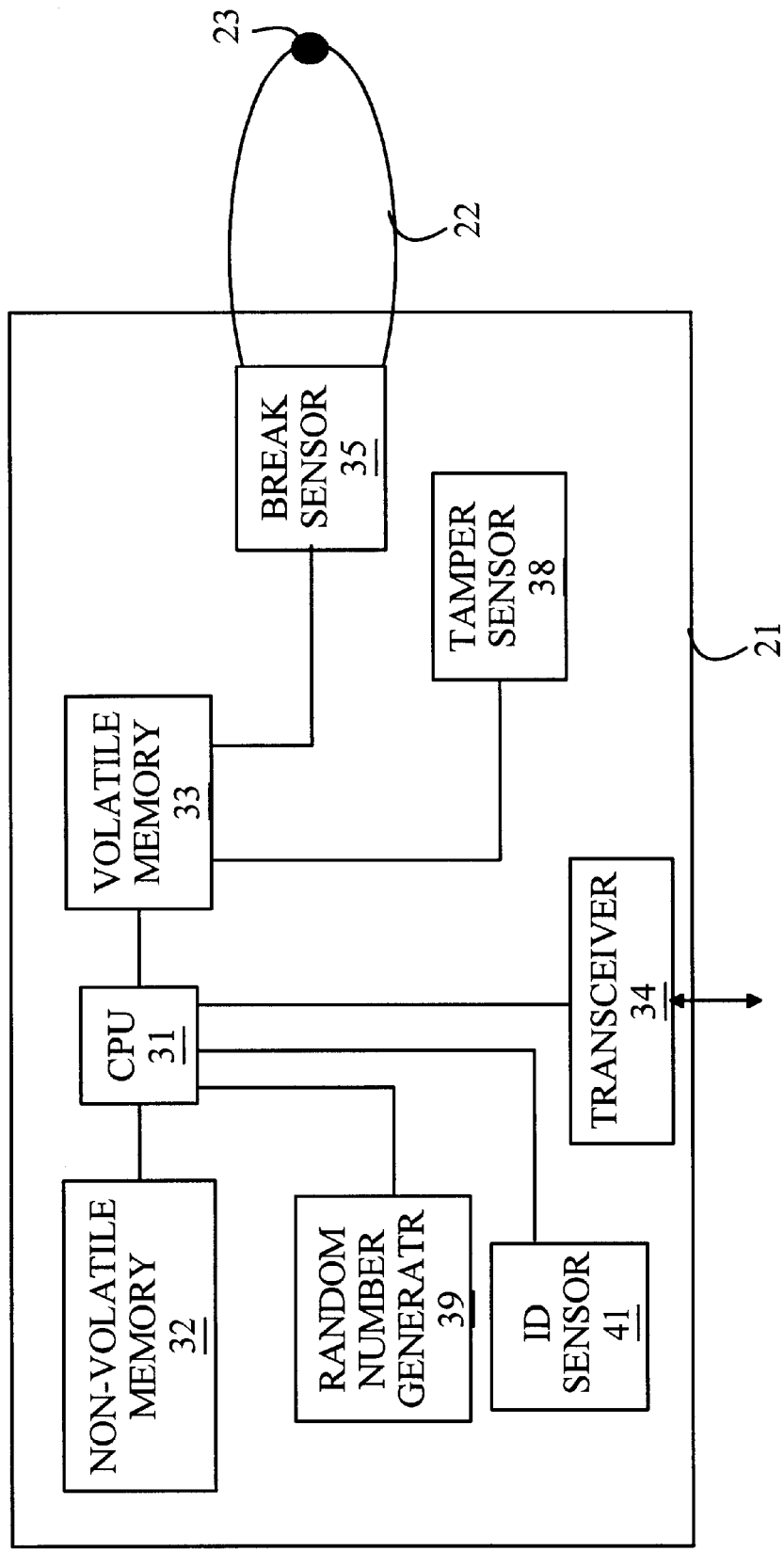
FIG. 2 is a block diagram of one embodiment of a badge 21 according to the present invention.

Having provided the above outline of the operation of a security system according to the present invention, a more detailed description of the operation of the badges and the communication protocols will now be given. Refer now to FIG. 2, which is a block diagram of one embodiment of a badge 21 according to the present invention. Badge 21 includes a processor 31 that utilizes a non-volatile memory 32 to store the operating system utilized by the processor. Badge 21 also includes a user certificate volatile memory 33 that is used to store the "permissions" granted to the user and other information needed to gain and maintain access to a terminal. Badge 21 is also assumed to hold an identification number that is stored in the non-volatile memory of the badge.

Badge 21 utilizes a transceiver 34 to communicate with the various computer terminals. Transceiver 34 may utilize any form of communication link to communicate with the computer terminals in the system. In the preferred embodiment of the present invention, transceiver 34 utilizes an infra-red link; however, communication links based on radio frequency signals or ultra-sound may also be utilized. Infrared or RF links are preferred because they impose the lowest power requirements on badge 21 which is typically powered by a battery. Infra-red links have the added advantage of assuring that the badge will only respond if it is near a terminal and properly oriented with respect thereto. In contrast, RF links tend to be omnidirectional, and RF signals can pass through many types of walls. Hence, a terminal cannot be assured that the badge wearer is nearby without some other form of badge localization.

In addition, badge 21 has a sensor 35 that detects a break in the continuity of cord 22. Whenever sensor 35 detects a break in cord 22, processor 31 erases the contents of memory 33. Similarly, if power is lost, the contents of memory 33 are lost. Badge 21 can also be equipped with other forms of "tamper" sensors, such as sensor 38, that cause the contents of memory 33 to be lost if someone attempts to open the badge or otherwise gain access to the contents of memory 33. Hence, badge 21 is automatically reset whenever it is removed, loses power, or subjected to tampering.

As will be explained in more detail below, badge 21 preferably includes a random number generator 39 that provides the random numbers utilized in the various secure communications protocols. Pseudo-random number generators based on computer computations that start from a "seed" are known to the art and may be utilized when the highest degree of security is not needed. However, in the preferred embodiment of the present invention, random number generator 39 utilizes one or more environmental sensors to generate the random numbers provided by generator 39 in a manner that cannot be predicted even by observing the previously generated random numbers provided by generator 39. Unpredictable random number sources can be based on temperature sensors or noise signals generated by resistors or other circuit components.

The affixation of the badge to the user prior to the badge being loaded by terminal 11 can be verified by security personnel stationed at a point that all users must pass before reaching terminal 11. Such verification prevents a user from closing clasp 23 when the badge is not affixed to the user and then presenting himself and the badge to terminal 11 for loading.

As noted above, the communications between the various terminals and badge 21 must be secure from eavesdropping. Data encryption protocols for securing such communications are well known to those skilled in the art, and hence, will not be discussed in detail here. For the purposes of this discussion, it will be assumed that terminal 11 and each badge have a protocol that allows terminal 11 and each badge to generate a "secret", denoted by "k" that is known only to terminal 11 and the particular badge in question. The value of k is determined by protocols that depend on the random numbers generated by generator 39. For example, the elliptic curve version of the Diffie-Hellman protocol may be utilized to generate such a secret. The reader is directed to "Handbook of Applied Cryptography" by Menezes, van Oorschot, and Vanstone (CRC Press, 1997, and to Elliptic Curves in Cryptography by Blake, Seroussi, and Smart, Cambridge University Press, 2000) for a more detailed discussion of various communication algorithms.

Consider a hospital setting in which controlled access to confidential records such as patient treatment records is to be provided to the clinicians while protecting the confidentiality of those records. Each clinician wears a badge similar to those described above. The badge is filled with the clinician's identity information, denoted by Cred, in the following discussion. This information is stored in the volatile memory of the badge as discussed above. In particular, the badge will automatically erase Cred and become inactive as soon as the badge is detached from the clinician to which it is assigned.

The badge is activated by the action of physically attaching the badge to a clinician and running an authentication protocol between the badge and an administrative computer such as terminal 11 discussed above. During the activation protocol, the administrative computer will verify the clinician's identity by scanning the clinician's retina. At the end of the authentication protocol, the badge will be loaded with Cred and thereby activated.

While being active (i.e., remaining worn by the clinician), the badge will be able to establish secure sessions of communications with one or more of the clinician's computers (denoted C) whenever the clinician faces the computer and is within the range of an infra-red communication link constructed from ports on C and the badge. These secure sessions of communications between the badge and C are part of a second protocol, referred to as the records protocol.

In the preferred embodiment of the present invention, the badge power supply is very limited; hence, the system is preferably setup in a manner that minimizes the demands on the badge power supply. In addition to performing the various communication protocols, the badge must be able to detect the presence of the administrative computer and C computers. In addition, the badge must be capable of signaling its continued presence to these computers during interactions with them. In the preferred embodiment of the present invention, the badge has a "dormant" state in which the badge listens for signals on the communication link and "wakes up" when a signal that needs a response is detected. With the exception of this listening activity and other housekeeping functions such as providing power to the volatile memory and tamper detection circuitry, the other power consuming functions of the badge are turned off in the dormant state.

The badge enters the dormant state after it is attached to the user. The administrative computer is programmed such that its transceiver sends out a periodic login signal indicating that it is ready to activate a badge. This login signal is one of the signals that the badge is programmed to detect in the dormant state. When the wearer approaches the computer, her badge detects this login signal and wakes up for the activation protocol in which the badge is loaded with Cred and activated such that the wearer can log onto a C computer. Once the activation protocol is completed, the badge again returns to the dormant state.

Each of the C computers likewise sends out a periodic login signal when that computer is free and ready to login a new user. This second login signal is also one of the signals detected by the badge in the dormant state. When the badge wearer approaches the C computer, the badge detects the login signal and switches from the dormant state to engage in the login protocol discussed below.

At the end of the C computer login protocol, the C computer transceiver is programmed to send a third signal that is recognized by the badge in the dormant state. This signal is used to verify that the user is still at the terminal. The badge is programmed to respond to this signal by sending a specific acknowledgment signal in return. This communication can be part of the dormant state operations or part of a second low power state.

If a badge does not acknowledge the verification signal described above, the C computer initiates a re-login procedure by sending a fourth signal that is recognized by the badge in the dormant or low power state. This signal is repeated until the badge responds accordingly or a predetermined period of time elapses. If the badge responds according to that protocol, the C computer resumes the verification signal. If the badge does not respond appropriately, the user is logged off of the terminal, and the C computer enters the mode in which it sends the C computer login signal.

The badge is capable of performing the less computationally intensive public-key encryption operations such as elliptic-curve point multiplication and generating the hash function SHA-1 utilized in the Secure Hash Standard as published in the Federal Register.

The level of security needed in the interchange between the administrative computer and the badge wearer depends on the level of security surrounding the administrative computer and the degree of honesty of the badge wearer. For example, if the badge wearer can be assumed to be honest, then the system does not need to guard against the wearer recording the exchange. This leaves only the possibility that a third party will eavesdrop on the exchange between the badge and the terminal. If the administrative computer is in a location that is secured with respect to such eavesdropping, the exchange need not be encrypted at all.

If, on the other hand, the badge wearer cannot be trusted, then an encryption protocol that is immune from eavesdropping must be utilized. In this case, any suitable public or private key encryption system may be used by the computers and the badges to develop a key for later use in encrypting messages. If a private key system is utilized, the system must be arranged in a manner that guarantees that the key cannot be extracted from the badge. For example, the badge can include tamper sensors that erase the key information if tampering is detected.

Similarly, the level of security needed in the exchanges between the C computers and the badge depend on the value of the information and the trustworthiness of the wearer. In general, the badge and the C computer must authenticate each other, since it is assumed that the C computers are not secure. If, however, the C computers are secure, then only the badge needs to be authenticated by the C computer. The level of security needed to assure privacy with respect to the communications between the badge and the C computer again depends on the ease with which these communications can be monitored. If there is a possibility of eavesdropping, then a suitable public or private key encryption system must be utilized in the authentication exchange. Similarly, the secondary protocol utilized at the C computers to re-establish a lost link with a badge can be replaced by any suitably secure protocol that is less computationally intensive that the login protocol used to commence the session between a badge wearer and C.

As noted above, the system can utilize any type of transceiver to generate the communication link between the badge and the relevant computer terminals. Infra-red sensors are preferred, however, because such sensors require relatively low power and provide increased security over other types of communication links such as RF links. An eavesdropper can monitor an RF signal from a location outside of the cubical or room in which the badge and terminal are operating. In contrast, light-based systems require the eavesdropper to have a clear line of sight to both the terminal and badge transceivers.

The above-described embodiments of the present invention utilized a sensor in an attachment cord to detect the removal of the badge from the person's body. However, other mechanisms for sensing the removal of the badge from the wearer can be utilized for this function. Any form of sensor that provides a signal when the badge is removed from the user can be utilized. For example, the badge can be attached to the wearer's clothing via a clip that can detect the opening thereof. When the clip is opened, the badge resets itself to the inactive state. Similarly, the badge can be incorporated into a wrist band that has an expandable band that provides a signal to the badge when the band expands sufficiently to allow it to be removed from the wearer's wrist.

In addition, embodiments in which the badge utilizes some form of biometric measurement to assure that the badge is still on the authorized individual's body can be constructed. Sensor's that detect body heat or pulse can be utilized for this function. Such sensors may be included in wristwatch-like embodiments of the invention in which the sensor is pressed against the wrist of the user when the badge is worn by the user. If the badge is removed, the temperature will decrease or the pulse signal will be lost. If the badge is carried in the person's wallet, a light sensor can be used to detect the removal of the badge from the wallet. Accordingly, break sensor 35 can be replaced by any sensor that detects the removal of the badge from the wearer. Similarly, cord 22 and clasp 23 can be replaced by any attachment mechanism that provides a signal indicating that the badge has been removed from the wearer.

The above-described embodiments of the present invention assume that the authentication of the wearer is performed by equipment attached to an administrative computer. However, embodiments in which authentication hardware is part of the badge itself can also be practiced. For example, the badge may include an identification sensor 41 such as a fingerprint scanner. In such an embodiment, memory 32 would also store a file of authorized fingerprints. In such an embodiment, the fingerprint scanner would be enabled when the controller in the badge detects the attachment of the badge to the wearer. Similarly, the badge may include a microphone that is used to record the voiceprint of the user after the badge is attached to the user. The detected voiceprint would then be compared to a library of voiceprints to verify the identity of the user.

The recognition work can also be split between the badge and the computer terminals. For example, the biometric identification hardware such as the fingerprint scanner, microphone, pulse detector, or temperature detector can be part of the badge. The measurements made by these elements would then be communicated to the computer terminal. The computer terminal would then compare the received measurements with data identifying the various authorized users.

While the above-described embodiments of the sensors for detecting the removal of the badge from the wearer have utilized a single attachment sensor, a combination of several sensors can also be utilized. For example, an attachment sensor constructed from a combination of sensors that detect both the temperature and pulse of the wearer can provide increased security.

Similarly, a combination of measurements can be utilized to increase the confidence level of the user identification process. For example, both a fingerprint and a series of questions posed to the wearer can be utilized.

It should be noted that the badges of the present invention are not permanently associated with particular individuals, and hence, an employee does not need to take his or her badge home. The badges can be picked up from a big basket near station A when needed and thrown back to the basket at the end of the day. Hence, the costs and inconvenience associated with losing or damaging a badge are significantly reduced.

Various modifications to the present invention will become apparent to those skilled in the art from the foregoing description and accompanying drawings. Accordingly, the present invention is to be limited solely by the scope of the following claims.

What is claimed is:

1. A security badge to be worn by a person, said badge comprising:

a data processor having a non-volatile memory and a volatile memory;

a transceiver for sending signals generated by said processor and receiving signals specifying operations to be carried out by said badge, said signals including access signals that are stored in the volatile memory and are developed in response to authentication of the person and that provide said person access to a secure system; and an attachment sensor for detecting the removal of said badge from said person, said attachment sensor causing information stored in said volatile memory to be altered such that said person no longer has access to said secure system when said attachment sensor detects said removal, wherein said volatile memory stores information related to a security clearance associated with said person.

2. The security badge of claim 1 wherein said volatile memory stores information enabling the wearer of said badge to gain access to a data processing system.

3. The security badge of claim 1 wherein said badge stores a program enabling said badge to load information in said volatile memory.

4. The security badge of claim 3 wherein said attachment sensor detects the attachment of said badge to said person and, in response thereto, enables said badge to load information in said volatile memory.

5. The badge of claim 1 wherein said transceiver comprises a receiver and a transmitter for respectively receiving and transmitting optical signals.

6. The badge of claim 1 further comprising a tamper sensor for detecting an alteration in said badge that could allow the contents of said volatile memory to be read, said tamper sensor causing information stored in said volatile memory to be rendered unreadable when said tamper sensor detects said alteration.

7. The badge of claim 6 wherein said tamper sensor causes one piece of information stored in said non-volatile memory to be rendered unreadable when said tamper sensor detects said alteration.

8. The badge of claim 1 wherein said badge has low and high power modes, said processor being capable of performing at least one computation in said high power mode that cannot be performed in said low power mode, said processor detecting a first signal from said transceiver while in said low power mode and causing said badge to enter said high power mode when said first signal is detected, wherein said badge consumes more power in said high power mode than in said low power mode.

9. The badge of claim 8 wherein said processor detects a second signal from said transceiver in said low power mode and responds by sending a reply signal without leaving said low power mode.

10. The badge of claim 1 wherein said processor executes a first program in response to receiving a first signal on said transceiver and a second program in response to receiving a second signal on said transceiver.

11. The badge of claim 1 wherein said attachment sensor comprises an attachment mechanism having an open position and a closed position for securing said badge to said person in said closed position and a position sensor for detecting that said mechanism is in said open position.

12. The badge of claim 11 wherein said attachment mechanism comprises a band for encircling part of said person's body.

13. The badge of claim 12 wherein said position sensor detects that said band includes a break.

14. The badge of claim 12 wherein said position sensor detects that said band has a length greater than a predetermined value.

15. The badge of claim 11 wherein said attachment mechanism comprises a clip for securing said badge to an article of clothing worn by said person.

16. The badge of claim 11 wherein said position sensor comprises a temperature sensor.

17. The badge of claim 11 wherein said position sensor comprises a pulse sensor for detecting the pulse of said person.

18. A security badge to be worn by a person, said badge comprising:
    a data processor having a non-volatile memory and a volatile memory;
    a transceiver for sending signals generated by said processor and receiving signals specifying operations to be carried out by said badge, said signals including signals that provide said person access to a secure system;
    an attachment sensor for detecting the removal of said badge from said person, said attachment sensor causing information stored in said volatile memory to be altered such that said person no longer has access to said secure system when said attachment sensor detects said removal, wherein said volatile memory stores information related to a security clearance associated with said person; and
    a random number generator that comprises a sensor for sensing an environmental variable that determines a random number generated by said random number generator.

19. The badge of claim 18 wherein the environmental variable sensed by the sensor comprises temperature.

20. The badge of claim 18 wherein the sensor further comprises a resistor and wherein the environmental variable corresponds to a random thermal noise signal generated by the resistor.

21. An access device adapted to be associate with a person, comprising:
    a sensor operable to detect separation of the device and the person; and
    a processor adapted to receive and store access signals developed in response to authentication of the person and indicating access privileges associated with the person, the processor operable to generate authentication signals from the stored access privileges and further operable to alter the generated authentication signals responsive to the sensor indicating the separation of the device from the person exceeds a threshold value.

22. The access device of claim 21 wherein the sensor comprises a sensor that detects at least one of temperature and pulse of the person.

23. The access device of claim 21 wherein the processor is operable to alter the generated authentication signals by terminating generation of the authentication signals.

24. The access device of claim 21 wherein the processor is operable to alter the generated authentication signals by erasing the stored access signals corresponding to the access privileges.

25. The access device of claim 24 wherein the processor further comprises volatile memory for storing the access signals and wherein the processor alters the stored access signals by removing power from the volatile memory.

26. The access device of claim 21 wherein the access signals include a secret code that expires after a time.

27. The access device of claim 26 wherein the secret code comprises day code that expires upon the start of the next day after the code was stored in the device.

28. The access device of claim 21 wherein the processor further comprises a transceiver for receiving the access signals and transmitting the authentication signals.

29. A method of utilizing an access device to provide a user with access to a computer system, the method comprising:
    authenticating the user;
    developing user access information indicating access privileges associated with the user in response to authentication of the user;

storing in the access device the user access information;

associating the device with the user;

detecting whether the access device is associated with the user;

providing the user access to the computer system according to the access privileges indicated by the access information while the device is associated with the user; and denying the user access to the computer system when the access device is detected as not being associated with the user.

30. The method of claim 29 wherein associating the access device with the user comprises sensing at least one of temperature and pulse of the user.

31. The method of claim 30 wherein detecting whether the access device is associated with the user comprises determining if the device has been removed from the user responsive to at least one of the sensed temperature falling below a threshold value and the loss the sensed pulse.

32. The method of claim 29 wherein associating the access device with the user comprises physically attaching the device to the user.

33. The method of claim 29 further comprising:

generating a random number;

encoding the access information using the random number prior to accessing the access information.

34. The method of claim 33 further comprising:

sensing an environmental variable; and generating the random number using the sensed environmental variable.

35. The method of claim 34 wherein the sensed environmental variable comprises at least one of temperature and thermal noise of resistor.

36. The method of claim 29 further comprising storing in the access device a secret code that expires after a time and denying the user access to the computer system when the secret code has expired.

37. The method of claim 29 wherein authenticating the user comprises at least one of performing a retinal scan on the user and performing a fingerprint scan on the user.

* * * * *